(12) United States Patent
Bachmann et al.

(10) Patent No.: US 11,906,066 B2
(45) Date of Patent: Feb. 20, 2024

(54) SEAL SUPPORT RING FOR A VALVE

(71) Applicant: VAT Holding AG, Haag (CH)

(72) Inventors: Christof Bachmann, Sennwald (CH); Hanspeter Frehner, Sevelen (CH); Martin Netzer, Blundez (AT); Florian Ehrne, Frümsen (CH)

(73) Assignee: Vat Holding AG, Haag (CH)

( * ) Notice: Subject to any disclaimer, the term of this patent is extended or adjusted under 35 U.S.C. 154(b) by 0 days.

(21) Appl. No.: 17/708,349

(22) Filed: Mar. 30, 2022

(65) Prior Publication Data

US 2022/0316602 A1 Oct. 6, 2022

(30) Foreign Application Priority Data

Apr. 1, 2021 (DE) .......................... 102021108429.6

(51) Int. Cl.
| | |
|---|---|
| *F16K 3/02* | (2006.01) |
| *F16K 3/18* | (2006.01) |
| *F16K 27/04* | (2006.01) |
| *F16K 3/312* | (2006.01) |
| *F16K 31/04* | (2006.01) |
| *F16K 27/00* | (2006.01) |
| *F16K 51/02* | (2006.01) |
| *F16K 3/06* | (2006.01) |

(52) U.S. Cl.
CPC .......... *F16K 3/0218* (2013.01); *F16K 3/0227* (2013.01); *F16K 3/06* (2013.01); *F16K 3/18* (2013.01); *F16K 3/312* (2013.01); *F16K 27/00* (2013.01); *F16K 27/04* (2013.01); *F16K 27/044* (2013.01); *F16K 27/045* (2013.01); *F16K 31/04* (2013.01); *F16K 51/02* (2013.01)

(58) Field of Classification Search
CPC ........ F16K 3/0218; F16K 3/18; F16K 27/044; F16K 3/0227; F16K 3/06; F16K 27/045; F16K 51/02; F16K 27/00; F16K 31/04; F16K 3/312; F16K 27/04
USPC ......................................... 251/359–365, 301
See application file for complete search history.

(56) References Cited

U.S. PATENT DOCUMENTS

| 2,370,751 | A | * | 3/1945 | Prager | ..................... F16K 3/207 251/159 |
|---|---|---|---|---|---|
| 5,577,707 | A | | 11/1996 | Brida | |
| 6,902,145 | B2 | * | 6/2005 | Latzer | ...................... F16K 3/10 251/177 |
| 2005/0109968 | A1 | | 5/2005 | Weiss | |
| 2006/0192170 | A1 | | 8/2006 | Lucas et al. | |

(Continued)

*Primary Examiner* — John Bastianelli
(74) *Attorney, Agent, or Firm* — Volpe Koenig

(57) ABSTRACT

A seal support ring (1) for a valve (2), particularly a vacuum valve, which has a throughflow opening (3) and a basic body (4), which annularly surrounds the throughflow opening, and a fastener arrangement (5) for fastening the seal support ring to a valve housing (6) of the valve. The basic body has a first side (7) on which the seal support ring, in a mounted state on the valve housing, lies against the valve housing, and the seal support ring has a seal ring (8) made from an elastomer which, in its position on the basic body, surrounds the throughflow opening. A casing wall (9) is arranged on the basic body and at least partially surrounds the throughflow opening and, on a second side (10) of the basic body (4) opposite the first side, protrudes from the basic body and has a larger inside diameter than the seal ring.

12 Claims, 7 Drawing Sheets

(56) References Cited

U.S. PATENT DOCUMENTS

2012/0205570 A1 8/2012 Lamprecht
2015/0345662 A1* 12/2015 Duelli .................. F16K 3/0281
137/315.29

* cited by examiner

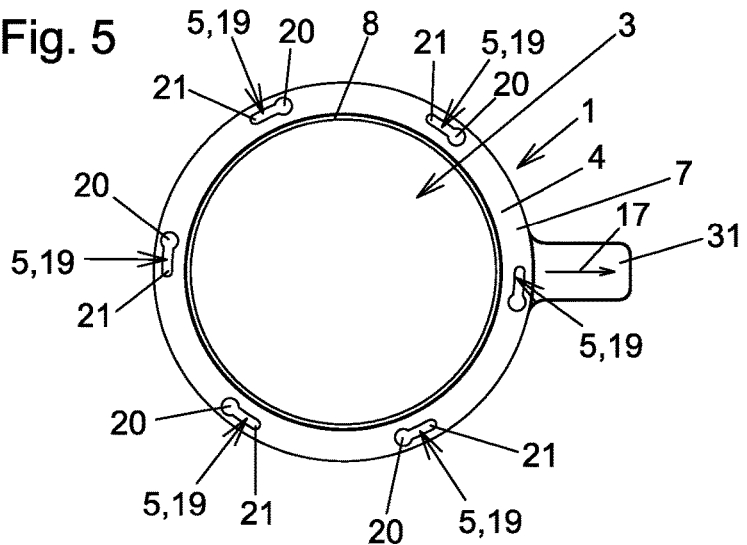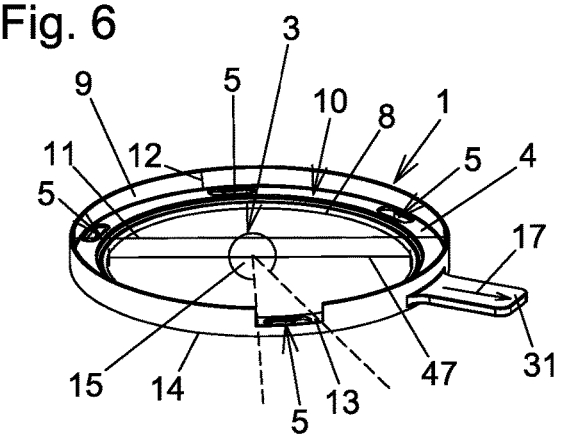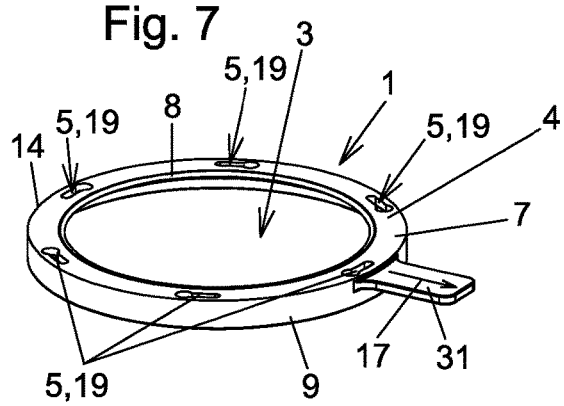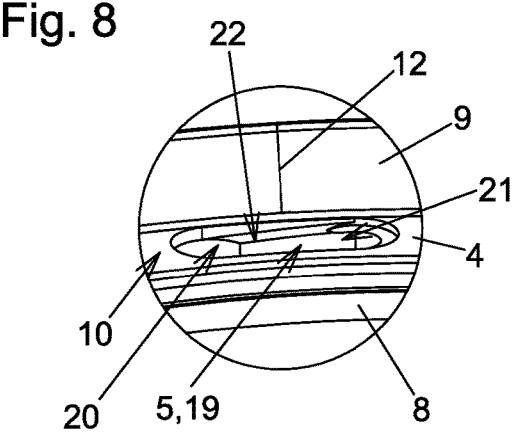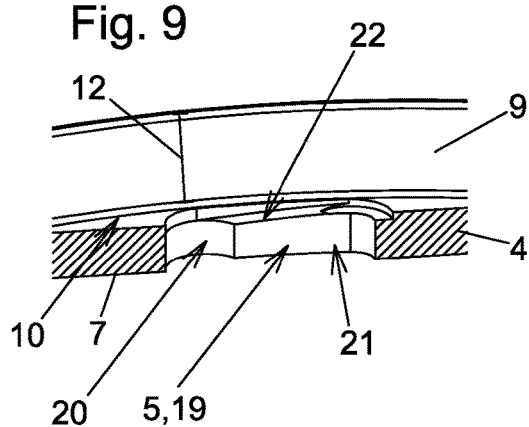

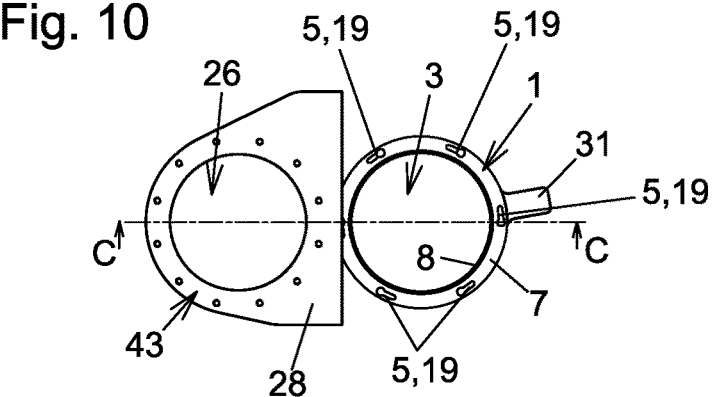
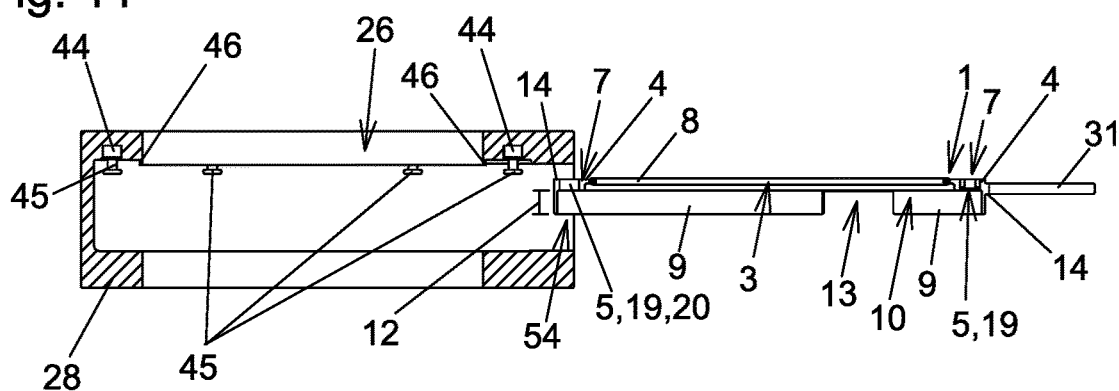
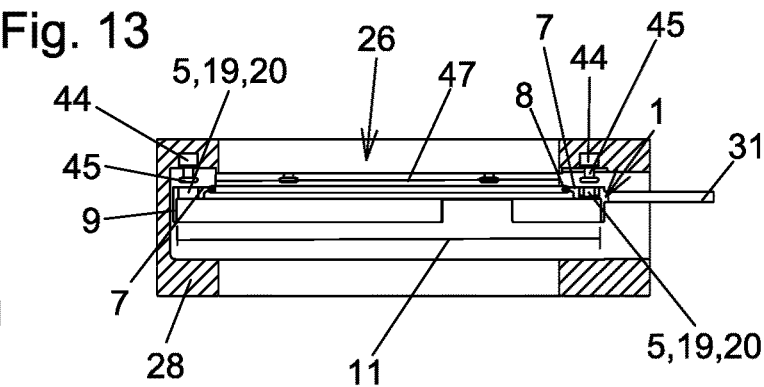
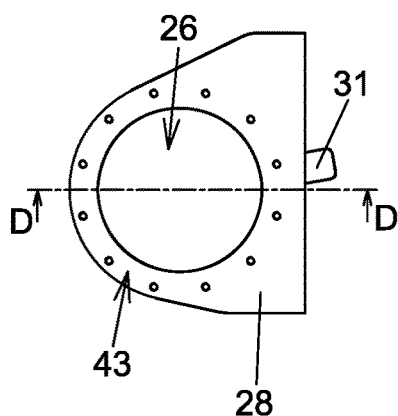
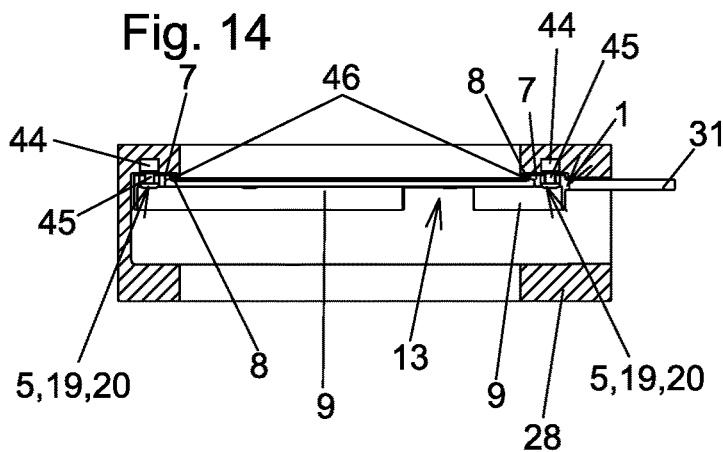

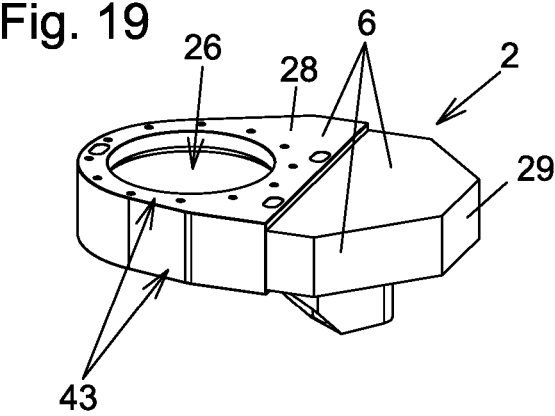
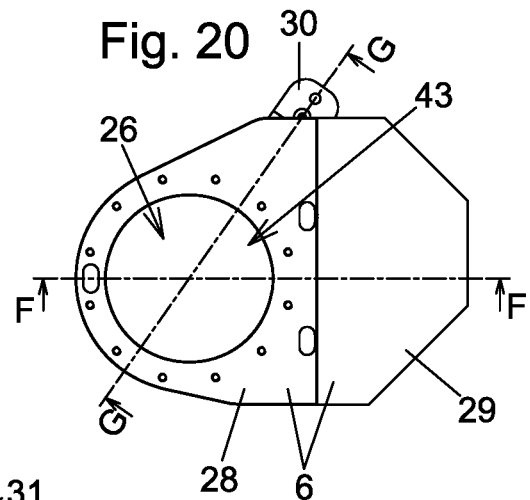
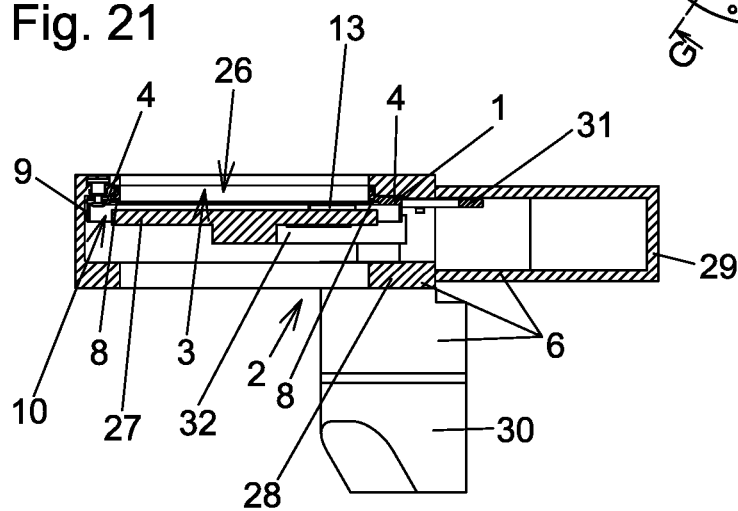
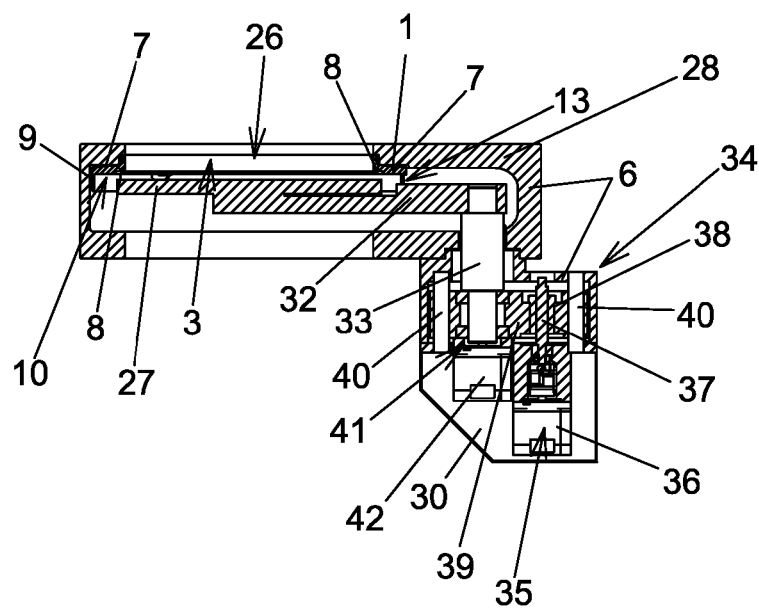

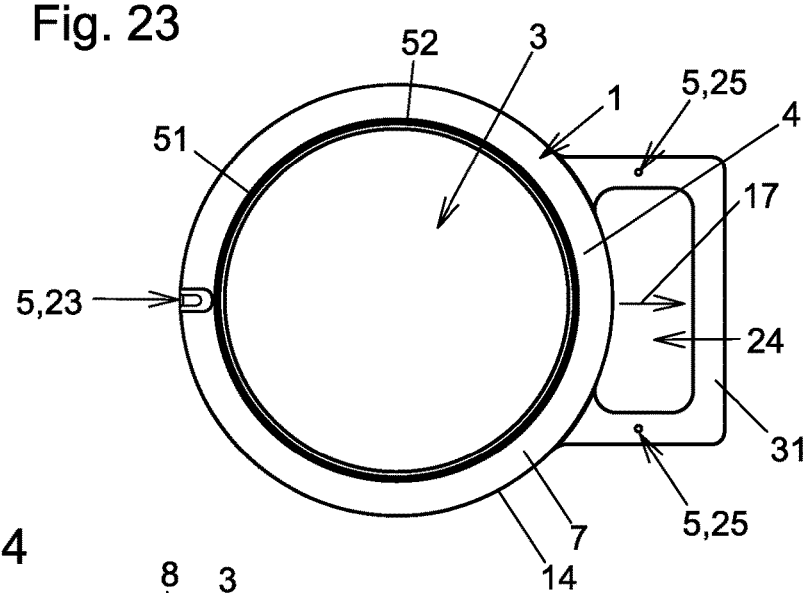
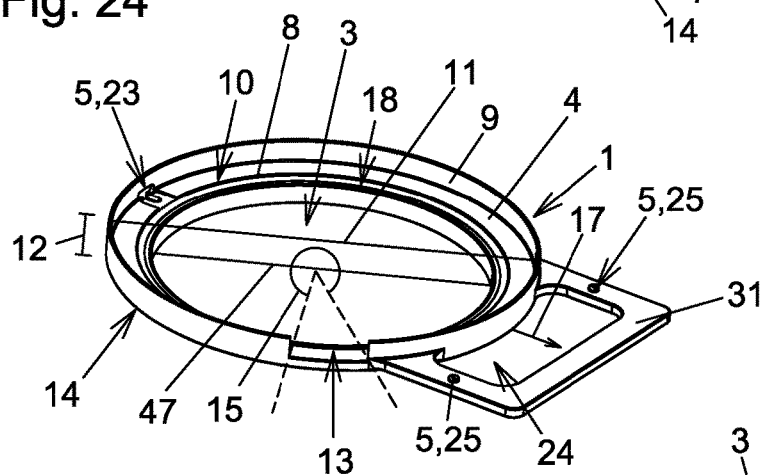
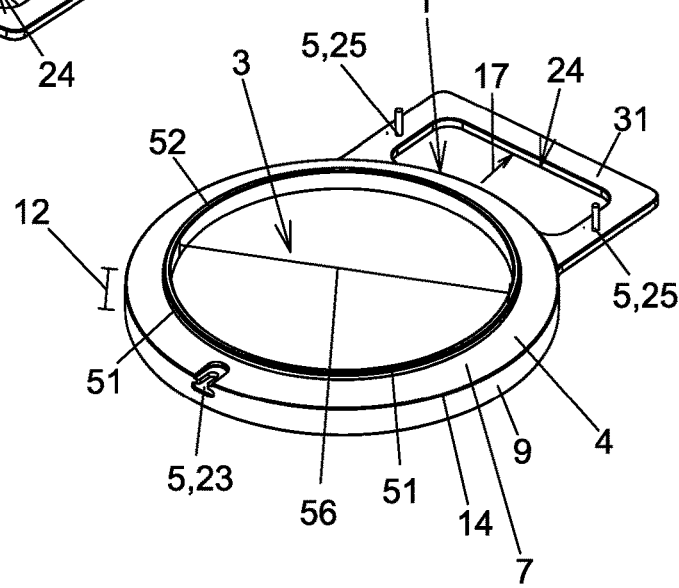
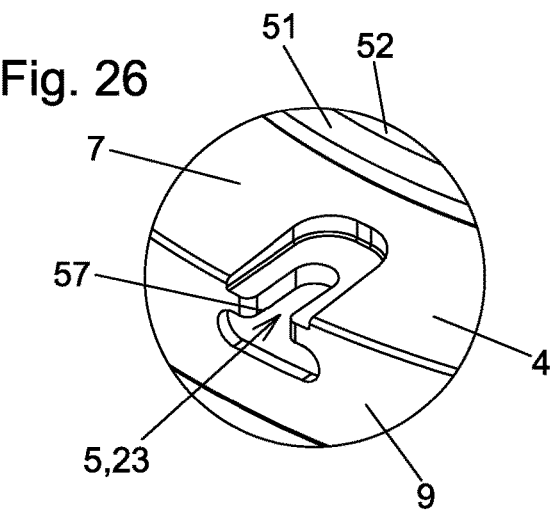

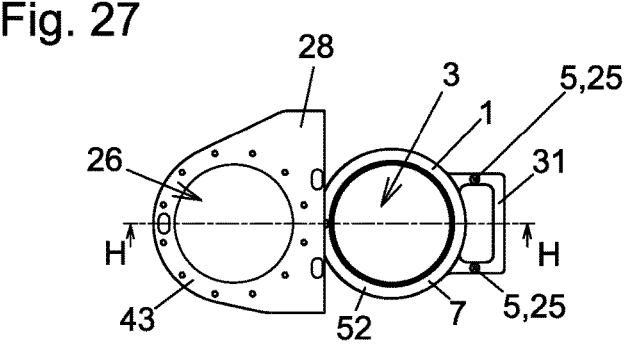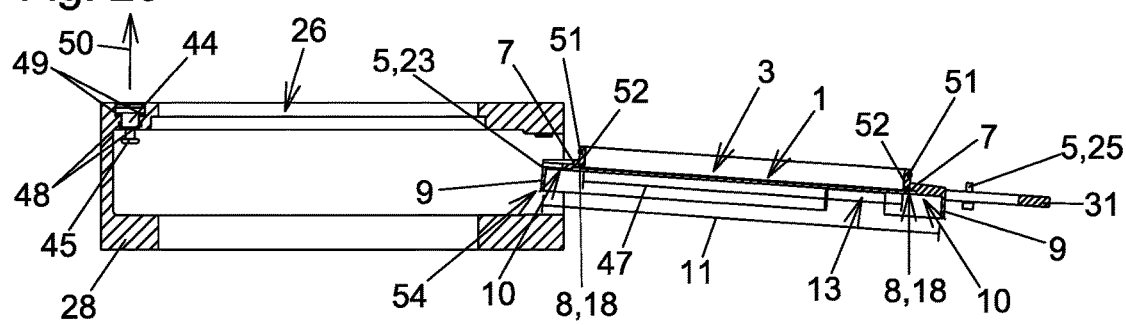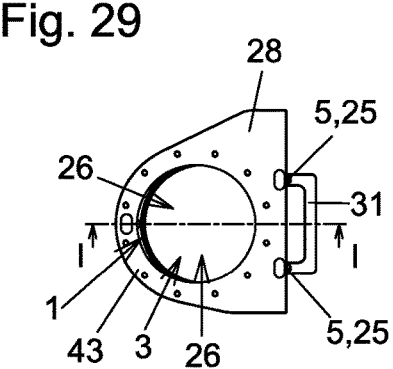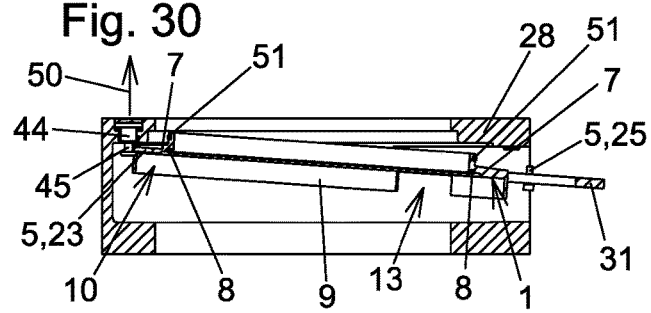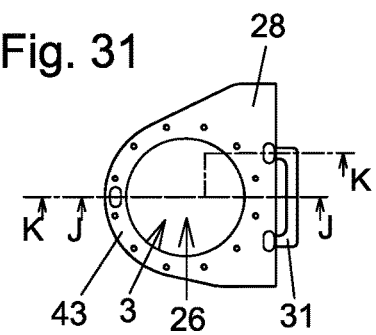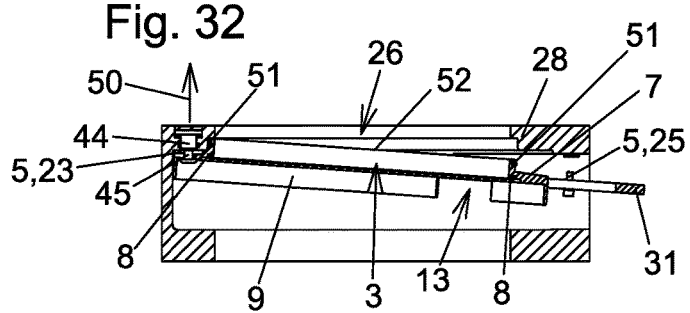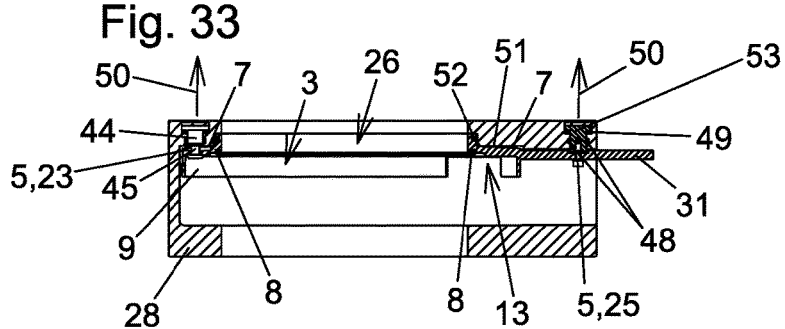

SEAL SUPPORT RING FOR A VALVE

INCORPORATION BY REFERENCE

The following documents are incorporated herein by reference as if fully set forth: German Patent Application No. DE 10 2021 108 429.6, filed Apr. 1, 2021.

TECHNICAL FIELD

The present invention relates to a seal support ring for a valve, in particular a vacuum valve, wherein the seal support ring has a throughflow opening and a basic body, which annularly surrounds the throughflow opening, and fastening means for fastening the seal support ring to a valve housing of the valve, wherein the basic body has a first side on which the seal support ring, in a state completely mounted on the valve housing, lies against the valve housing, and the seal support ring has at least one seal ring made from an elastomer which, in its position arranged on the basic body, surrounds the throughflow opening.

Furthermore, the invention also relates to a valve, in particular vacuum valve, having such a seal support.

BACKGROUND

Seal support rings of the type in question, as are known, for example, from U.S. Pat. No. 5,577,707, are used in valves, in particular in vacuum valves, in order to be able to more simply change the seal ring, against which the valve disc of the valve lies in the closed position. For this purpose, the seal support ring can be removed from the valve housing and replaced. It is just as readily possible to replace only the seal ring on the seal support ring in order then to reinsert the seal support ring into the valve housing.

SUMMARY

It is the object of the invention to improve seal support rings of the type mentioned at the beginning to the effect that, with the valve, into which the seal support ring according to the invention is fitted, particularly good metering of the volumetric flow passing through the valve opening is possible during opening and closing of the valve opening if the valve disc is located in the vicinity of the closed position.

To achieve this object, the invention proposes, in the case of a seal support ring of the type mentioned at the beginning, that a casing wall is arranged on the basic body, wherein the casing wall surrounds the throughflow opening at least in regions and, on a second side of the basic body opposite the first side, protrudes from the basic body and has a larger inside diameter than the seal ring.

By means of the casing wall and the basic body of the seal support ring, a receiving space which is laterally delimited by the casing wall and into which the valve disc protrudes during the closing of the valve, on the path thereof in the direction of the closed position, is created on the second side of the basic body. During the opening of the valve, the valve disc, starting from the closed position, is also still located within said receiving space for a certain portion of the opening path. In these positions of the valve disc, the medium flowing through the valve opening has to flow therethrough in the vicinity of the closed position, i.e. through an annular space between casing wall and valve disc, thus enabling the creation of flow conditions which are very readily controllable and which permit a highly precise metering of the volumetric flow flowing through the valve opening. The invention therefore permits fine metering of the volumetric flow precisely when this is necessary, namely when the valve disc is located in the vicinity of its closed position.

In the state completely mounted on the valve housing, the first side of the basic body of the seal support ring can lie directly against the valve housing. However, it is just as readily possible that although, in the state of the seal support ring completely mounted on the valve housing, the first side of the basic body faces the region of the valve housing against which the seal support ring lies, it is at a distance away from this region of the valve housing, for example because the seal ring or an additional seal ring lies directly against this region of the valve housing.

Preferred exemplary embodiments of the invention make provision for the casing wall to have, on the second side opposite the first side, a protrusion of 15 mm to 40 mm, preferably of 20 mm to 30 mm, in relation to the basic body. In other words, it is therefore advantageously provided that the casing wall protrudes 15 mm to 40 mm, preferably 20 mm to 30 mm, over the basic body on the second side. This is generally sufficient in order to ensure the fine metering capability in the positions of the valve disc in which this is especially required, namely in the vicinity of the closed position.

In preferred embodiments of the invention, the casing wall is arranged on the basic body on an outer edge of the basic body facing away from the throughflow opening of the seal support ring. There are various possibilities for arranging the casing wall on the basic body. The casing wall can be fastened to the basic body by suitable connecting methods which are known per se in the prior art, such as welding, soldering, adhesive bonding, screwing, clamping and the like. However, particularly preferred embodiments of the invention make provision for the casing wall to be integrally formed on the basic body. In other words, this means that the basic body and the casing wall are advantageously connected integrally to each other or form a common, integral part.

The casing wall can be a circular cylinder casing wall which is completely circumferentially closed. In such embodiments, the abovementioned protrusion of the casing wall in relation to the basic body is advantageously formed identically overall. However, in order to create space for passage of a supporting arm, to which the valve disc is fastened, in the casing wall, it can also be provided that a wall opening in the form of a blind hole is arranged in the casing wall. The supporting arm supporting the valve disc can then protrude into said wall opening in the form of a blind hole when the valve disc is in the vicinity of the closed position. The wall opening in the form of a blind hole is therefore advantageously open towards the side facing away from the basic body of the seal support ring.

Within the context of the volumetric flow passing through the valve opening being able to be metered as readily as possible, this wall opening, however, should not be unnecessarily large. Within this context, preferred variants of the invention make provision for the casing wall to be designed over a centre point angle of at least 300°, preferably of at least 325°, as a circular cylinder casing wall which is closed per se. Even for these regions in which the casing wall is designed as a circular cylinder casing wall which is closed per se, it is advantageous for the same protrusion of the casing wall over the basic body to be maintained overall.

In an advantageous manner, it is provided in the case of seal support rings according to the invention that the casing wall, as seen in a section, is arranged at a right angle relative to a surface of the basic body on the first side of the basic body.

It is preferably provided that the seal ring is the seal by means of which the valve disc is sealed in its closed position against the seal support ring. In this context, the valve disc, in its closed position, advantageously lies against the seal ring of the seal support ring. However, in preferred embodiments of the invention, said seal ring can have a dual function by it simultaneously also sealing the seal support ring against the valve housing. As an alternative thereto, however, the seal support ring can also have an additional seal ring which ensures that the seal support ring is sealed against the valve housing. With such embodiments, the seal ring could also be referred to as the first seal ring and the additional seal ring as the second seal ring. Of course, this does not preclude the fact that more than two seal rings are also provided on the seal support ring. In the case of two or more seal rings, it is at any rate advantageously provided that the casing wall has a larger inside diameter than all of the seal rings of the seal support ring.

For the fastening of the seal ring and optionally also of the additional seal ring or else of the other seal rings, it can be provided that said seal ring and/or additional seal ring/other seal rings is or are fixed to the basic body. This fixing to the basic body can take place, for example, by vulcanizing the seal ring on the basic body. The same can apply to the additional seal ring or else to other further seal rings. In these embodiments, the entire seal support ring then generally has to be exchanged if the seal ring has to be replaced during maintenance work on the valve.

In order to be able to exchange only the seal ring by itself, in other embodiments of the invention it is, however, also provided that the seal ring is arranged exchangeably in a groove of the basic body. In these embodiments, the seal ring can be exchanged by itself by being removed from the groove of the basic body and replaced by a new seal ring. The same can, of course, also be realized for the additional seal ring and further seal rings which may be present. These seal rings may also be arranged in a correspondingly exchangeable manner in grooves of the basic body or, in general terms, of the seal support ring.

In principle, a multiplicity of different possibilities or fastening means are available with which the seal support ring can be fastened to the valve housing of the valve. This should in principle be a releasable type of fastening. It is at any rate advantageous if at least a portion of the fastening means of the seal support ring is fastened on or in the basic body thereof. In order to install and remove the seal support ring on or from the valve housing, it is advantageously provided that the seal support ring has a handle protruding from the basic body outwards, in a direction away from the throughflow opening. This handle can be used to grip and hold the seal support ring during the installation and during the removal operation.

There are various possibilities for the configuration of the fastening means in the seal support ring. One variant makes provision, for example, for the seal support ring to have, as fastening means, a sequence of in each case keyhole-shaped openings formed spaced apart from one another in the basic body. Said keyhole-shaped openings can be arranged around the throughflow opening spaced equidistantly apart from one another in the basic body. It is preferably provided that the keyhole-shaped openings each have a head portion and an elongate channel portion which is tapered in relation to the head portion, and the channel portion is delimited by ramp-shaped oblique surfaces of the basic body. The channel portions are advantageously formed here in the same curvature as the basic body that annularly surrounds the throughflow opening. A method for installing such a seal support ring in a valve housing advantageously makes provision for the seal support ring to initially be introduced into the valve housing in such a manner that the valve opening of the valve and the throughflow opening of the seal support ring are arranged in alignment with each other. Subsequently, the seal support ring is placed on the first side of the basic body against a region of the valve housing surrounding the valve opening, wherein mushroom-shaped heads of fastening bolts of the valve housing are introduced into the head portions of the keyhole-shaped openings in the basic body of the seal support ring. The seal support ring is subsequently rotated relative to the valve housing in such a manner that the mushroom-shaped heads of the fastening bolts of the valve housing penetrate the tapered channel portions and slide along the ramp-shaped oblique surfaces of the basic body, that delimit the channel portions, until the seal support ring is fastened in a clamping manner to the valve housing. The state of the seal support ring completely mounted on the valve housing is therefore achieved. The method for removing such a seal support ring then correspondingly takes place in the reverse sequence of the individual method steps.

In an alternative embodiment of a seal support ring according to the invention, it is provided, for the fastening thereof in the valve housing, that one of the fastening means on the basic body is an undercut groove in the form of a blind hole which is open towards an outer edge of the basic body facing away from the throughflow opening, and a second of the fastening means is at least one screw which is arranged on the seal support ring on a fixing side opposite the groove. In this embodiment of the seal support ring, a method for installing same in the valve housing makes provision for the seal support ring to first of all be introduced into the valve housing in such a manner that a mushroom-shaped head of a fastening bolt on the valve housing penetrates the undercut groove in the form of a blind hole which is open towards the edge of the basic body facing away from the throughflow opening. The seal support ring is subsequently pivoted with the first side of the basic body in the direction of the region of the valve housing surrounding the valve opening until the seal support ring, on the first side of the basic body, lies against the region of the valve housing surrounding the valve opening and the valve opening of the valve and the throughflow opening of the seal support ring are aligned with each other. Subsequently, the at least one screw which is arranged on the seal support ring is then screwed into a nut of the valve housing in order to fix the seal support ring in this position. The installation operation is therefore then finished and the state of the seal support ring completely mounted on the valve housing achieved. The method for removing such a seal support ring then takes place in turn in a corresponding manner in a reverse sequence of the individual method steps.

In addition to the seal support ring per se, the invention also relates to a valve having a valve housing and a valve opening in the valve housing and a valve disc for closing the valve opening in a closed position of the valve disc, wherein it is provided according to the invention that a seal support ring according to the invention is fastened removably to the valve housing, wherein the valve opening of the valve and the throughflow opening of the seal support ring are arranged aligned with each other, and the valve disc, in the closed position, lies against the seal ring of the seal support ring and is surrounded by the casing wall of the seal support ring.

As already explained at the beginning, provision is therefore made in the case of such valves according to the invention for the valve disc, in its closed position, to be arranged in a receiving space delimited by the casing wall and the basic body of the seal support ring. The effects thereby arising during the opening and closing of the valve, in the context of metering the volumetric flow passing through the valve opening as readily as possible, have already been explained further above.

Such a valve according to the invention is advantageously what is referred to as a shuttle valve. It is advantageously therefore a valve in which, during the opening and closing, the valve disc is movable to and fro between the closed position and an intermediate position along a linear first movement path, and is pivotable to and fro between the intermediate position and the full open position along a second movement path. The first movement path is advantageously orthogonal to the second movement path. Such shuttle valves are just as well known per se as the valve drives that are required for carrying out these movements along the two movement paths, and therefore reference can be made in this regard to the prior art.

The valve according to the invention is advantageously what is referred to as a vacuum valve, i.e. a valve which can be inserted in what is referred to as vacuum engineering. As a rule, vacuum engineering is referred to if operating states with pressures less than or equal to 0.001 mbar (millibar) or 0.1 Pascal are reached. Vacuum valves are valves which are configured for these pressure ranges and/or corresponding pressure differences in relation to the environment. However, vacuum valves can generally also be referred to if they are configured for pressures below normal pressure, i.e. below 1 bar.

Apart from the seal ring or the seal rings, the seal support ring is advantageously composed of a metal, preferably of aluminium or an aluminium alloy or stainless steel. The surfaces of the aluminium or of the aluminium alloy can be, for example, blank or hard-anodized.

The elastomer of the seal rings is preferably perfluoroelastomer (FFKM).

BRIEF DESCRIPTION OF THE DRAWINGS

Further features and details of preferred embodiments of the invention will be explained by way of example below in the description of the figures, in which:

FIGS. 1 to 17 show illustrations of a first exemplary embodiment according to the invention of a seal support ring and of a corresponding valve;

FIGS. 19 to 33 show illustrations of a second exemplary embodiment according to the invention of a seal support ring and of a corresponding valve.

DETAILED DESCRIPTION

Figure 1:
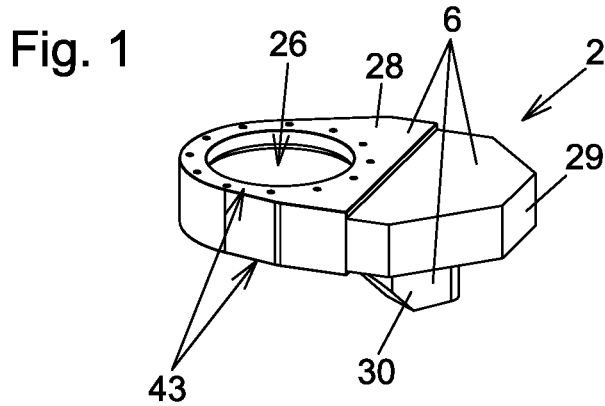
Figure 2:
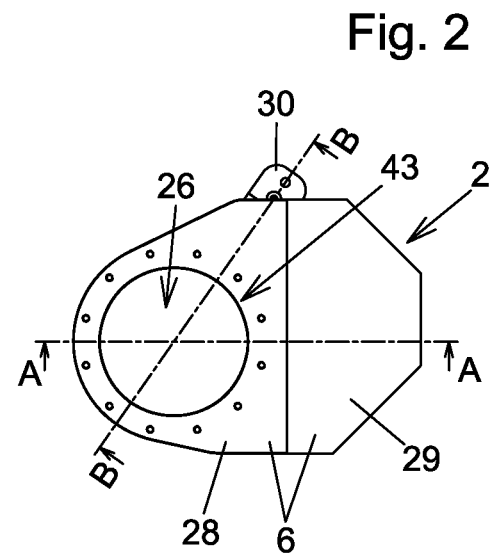
Figure 3:
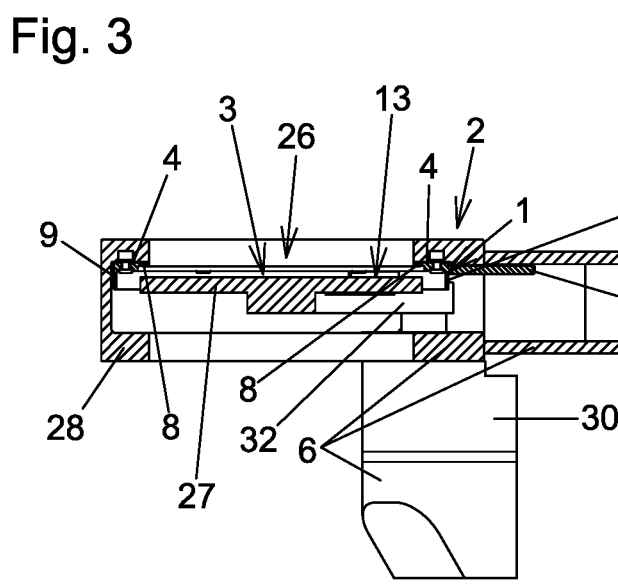
Figure 4:
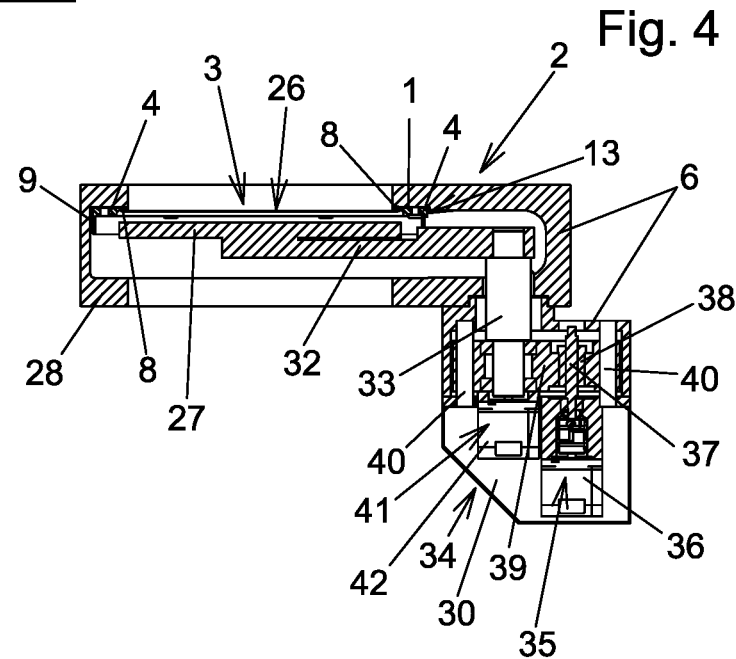

In the first exemplary embodiment, FIG. 1 shows a perspective view from the outside of a valve 2 according to the invention. FIG. 2 shows a top view of said valve 2, with the intersecting lines A-A and B-B being shown. The section through the valve 2 along the intersecting line A-A is shown in FIG. 3. FIG. 4 illustrates the section along the intersecting line B-B. The first exemplary embodiment of the seal support ring 1 according to the invention in its state completely mounted on the valve housing 6 or on the first housing part 28 thereof is shown in FIGS. 3 and 4. FIGS. 5 to 9 show various illustrations of the seal support ring 1 of the first exemplary embodiment according to the invention detached from the valve 2. With reference to FIGS. 10 to 17, the installation of the seal support ring 1 in the valve housing 6 or in the first housing part 28 thereof is subsequently then also explained together with further details regarding the construction of seal support ring 1 and valve 2.

It can readily be seen in FIG. 1 that the valve housing 6 of the valve 2 in this exemplary embodiment is composed of three housing parts. The valve opening 26 is situated in the first housing part 28. More precisely, this exemplary embodiment involves two openings arranged opposite each other. This is firstly the valve opening 26, which is closed by the valve disc 27 in the closed position thereof, and, secondly, the opening opposite said valve opening in the valve housing 6. In other embodiment variants, the opening mentioned last can also be completely omitted in a corresponding construction of the valve housing 6 or else can be closable by means of an additional valve disc. This is known per se. In the last-mentioned case, provision may also be made for two seal support rings 1 to be correspondingly used. All these are, however, modifications of the invention which, with knowledge of the invention, are at the discretion of a person skilled in the art and are accordingly not explained further here. In a corresponding manner, the additional opening in the valve housing 6 opposite the valve opening 26 which is present here in this example will not be discussed in more detail below. The seal support ring 1 according to the invention is at any rate correspondingly also arranged in the housing part 28. The valve disc 27 is pivoted into the second housing part 29 in the open position. The second housing part 29 can be removed from the first housing part 28 in order to be able to introduce the seal support ring 1 into the valve housing 6 or into the first housing part 28 during the installation and to be able to remove same correspondingly during the removal. Even if the seal support ring 1 in the exemplary embodiment shown here is arranged in the first housing part 28, the wording that the seal support ring is arranged in the valve housing 6 should nevertheless be understood as a synonym.

The valve drive 34 which will also be explained by way of example here below with reference to FIG. 4 is situated in the third housing part 30 of the valve housing 6. As stated, however, corresponding valve drives 34 are known per se and can be realized in a wide variety of embodiments according to the prior art.

Returning to FIGS. 1 and 2, it can readily be seen that a flange 43 is in each case arranged on the valve housing 6 on both outer sides around the valve openings 26, which are closable by means of the valve disc 27. By means of these flanges 43, the valve 2 can be fastened in a manner known per se to corresponding process chambers, media-guiding lines and the like, as is known per se in the prior art and does not need to be explained further.

It can be seen in the sectional illustration according to FIG. 3 how the seal support ring 1 according to the invention of the first exemplary embodiment is mounted in the valve housing 6 or in the first housing part 28 thereof. The valve disc 27 which is supported by the supporting arm 32 or is fixed to the latter is illustrated in FIG. 3 and also FIG. 4 in a position raised from the seal ring 8, i.e. not in the closed position, but in the vicinity of the closed position thereof. In this position illustrated here, an annular flow channel is formed between the casing wall 9 and the valve disc 27 when a volumetric flow of corresponding medium or fluid flows through the valve opening 26. By means of the flow-conducting effect of casing wall 9 and valve disc 27, the volumetric flow in each case flowing therethrough can be very precisely metered by moving the valve disc 27 in the direction of the seal ring 8 and therefore in the direction towards the closed position and in the opposite direction. The construction of the seal support ring 1 and also the installation thereof and thus also fastening in the valve housing 6 or in the first housing part 28 will be explained more precisely further below with reference to the following figures.

The valve drive 34 realized here for moving the valve disc 27 will now be discussed first with reference to FIG. 4. As stated, said valve drive, however, can also be realized in a wide variety of different embodiments that are known per se in the prior art.

It can readily be seen in FIG. 4 that the valve disc 27 is fixed to the supporting arm 32. The supporting arm 32 is in turn connected fixedly to the axle bolt 33. It can also be seen in FIG. 4 that the supporting arm 32 is guided through the wall opening 13, which will also be explained further below, in the casing wall 9 of the seal support ring 1 when the valve disc 27 is correspondingly situated in the vicinity of the seal ring 8 and therefore at the closed position.

In the exemplary embodiment shown here, the valve drive 34 is composed of two partial drives. It has a lifting drive 35 and a pivoting drive 41. The motor 36, here, for example, an electric motor which is known per se, of the lifting drive 35 is fastened fixedly to the third housing part 30. The motor 36 serves to rotate the spindle 37 about its longitudinal axis. The spindle 37 is in turn in threaded engagement with the nut 38. The nut 38 is fastened fixedly to a carriage 39. This carriage 39 is mounted in a linearly displaceable manner in is longitudinal direction on the guide bolt 40, which is in turn arranged fixedly on the third housing part 30. The pivoting drive 41 or the motor 42 thereof is fixed to the carriage 39. The axle bolt 33 and therefore the supporting arm 32 which is fixed thereon together with the valve disc 27 can in turn be rotated or pivoted about the longitudinal axis of the axle bolt 33 by the motor 42.

In order to open the valve 2 from the closed position of the valve disc 27, in which the latter lies against the seal ring 8, the lifting drive 35 is actuated. By rotation of the spindle 37 in the corresponding direction about its longitudinal axis, the carriage 39 together with the pivoting drive 41 is displaced along the guide bolts 40. This has the result that the valve disc 27 together with supporting arm 32 and axle bolt 33 is lifted off from the seal ring 8 along the first linear movement path. The intermediate position mentioned at the beginning is then reached when the valve disc 27 is lifted off from the seal ring 8 to such an extent that it no longer collides with the casing wall 9 during the subsequent pivoting about the longitudinal axis of the axle bolt 33. In this way between the closed position and said intermediate position, the interaction between casing wall 9 and valve disc 27, as stated, permits particularly good metering of the volumetric flow passing through the valve opening 26 and also through the throughflow opening 3 of the seal support ring 1.

In the intermediate position, the valve disc 27 is lifted off from the seal ring 8 by a corresponding distance. However, it continues to cover the valve opening 26. In order now to pivot the valve disc 27 from said intermediate position to the maximum open position, the motor 42 of the pivoting drive 41 is actuated. In preferred embodiment variants, like those shown here, in the maximum open position, the valve disc 27 completely releases the valve opening 26. In other words, in the maximum open position, it is therefore pivoted so far about the longitudinal axis of the axle bolt 33 into the second housing part 29 that it completely releases the valve opening 26. However, exemplary embodiments are also conceivable in which this is not necessarily the case.

FIG. 5 now shows a top view of the first side 7 of the seal support ring 1 of the first exemplary embodiment according to the invention, in which the seal support ring 1, in the fully mounted state, lies against the valve housing 6 or here, in this exemplary embodiment, against the first housing part 28 thereof. In this first exemplary embodiment, the seal support ring 1, in the fully mounted state, lies with the seal ring 8 directly against the valve housing 6 or against the first housing part 28 thereof. FIG. 6 shows a perspective illustration in which the second side 10 of the basic body 4 of the seal support ring 1 opposite the first side 7 can be seen. On said second side 10, the annular basic body 4 and the casing wall 9 together delimit the receiving space into which the valve disc 27 protrudes on its path along the first movement path towards the closed position. FIG. 7 shows a perspective view of this seal support ring 1, in which, in turn, the first side 7 can be seen. FIGS. 8 and 9 show detail illustrations of the embodiment, realized in this exemplary embodiment of the seal support ring 1, of the fastening means 5 of the seal support ring 1, with which the latter is fastened to the valve housing 6 or to the first housing part 28 thereof.

It can readily be seen in FIGS. 5 to 7 that the seal support ring 1 has a throughflow opening 3 and a basic body 4 annularly surrounding the throughflow opening 3, and the fastening means 5 for fastening the seal support ring 1 to the valve housing 6 of the valve 2. The basic body 4 has the first side 7 on which the seal support ring 1, in its state fully mounted on the valve housing 6, lies against the valve housing 6 or here against the first valve housing part 28 thereof. In this exemplary embodiment, the seal support ring 1 in turn has precisely one seal ring 8 made from an elastomer. In this exemplary embodiment, the seal ring 8 made from the elastomer, preferably from perfluoroelastomer, is vulcanized on the basic body 4, here specifically on an edge of the basic body 4 facing the throughflow opening 3. In principle, however, other ways of fastening the seal ring 8 to the basic body 4 are also conceivable. Seal rings 8 made from elastomer are known per se in a wide variety of embodiments and can be correspondingly used here. At any rate also in this first exemplary embodiment, the seal ring 8 surrounds the throughflow opening 3. According to the invention, it is now provided, in the case of the seal support ring 1, that the casing wall 9 is arranged on the basic body 4. The casing wall 9 surrounds the throughflow opening 3 at least in regions. The casing wall 9 protrudes from the basic body 4 on the second side 10 of the basic body 4 opposite the first side 7. It is shown by way of example in FIG. 6 that the casing wall 9 has a larger inside diameter 11 than the seal ring 8. This is readily seen by comparing the inside diameter 11 of the casing wall 9 with the inside diameter 47 of the seal ring 8.

In the exemplary embodiment which is shown, the casing wall 9 is formed integrally on the basic body 4 of the seal support ring 1. As already explained at the beginning, this can alternatively however also be of two-part design initially if a corresponding connection is then undertaken, for example by means of welding, soldering, adhesive bonding or another type of connection.

Also in this exemplary embodiment, the casing wall 9 has, on the second side 10 opposite the first side 7, a protrusion 12 in relation to the basic body 4. As already explained at the beginning, this protrusion 12 is advantageously in the range of 15 mm to 40 mm, particularly preferably in the range from 20 mm to 30 mm. Also in this exemplary embodiment, the casing wall 9 is arranged on the basic body 4, or likewise integrally formed here, on the outer edge 14 of the basic body 4 facing away from the throughflow opening 3. The wall opening 13 which has already been mentioned, which is in the form of a blind hole and through which the supporting arm 32 can be guided, is located in the casing wall 9. The wall opening 13 in the form of a blind hole is correspondingly open in the direction away from the basic body 4 of the seal support ring 1.

Within the context of metering the volumetric flow passing through the valve opening 26 and the throughflow opening 3 as readily as possible, it is provided that the casing wall 9, as also shown here in the exemplary embodiment, apart from the optionally present wall opening 13, is completely designed as a circular cylinder casing wall which is closed per se. In this region of the design as a circular cylinder casing wall which is closed per se, overall the same protrusion 12 as also shown here is advantageously realized. In general terms, it is provided in this context that the casing wall 9 is designed as a circular cylinder casing wall which is closed per se over a centre point angle 15 of at least 300°, preferably of at least 325°. This is also realized here in this first exemplary embodiment. The centre point angle 15 is shown by way of example in FIG. 6.

In order to simplify the installation and removal of the seal support ring 1 in the valve housing 6 or here specifically in the first housing part 28 thereof, it is provided, in the case of preferred embodiments of the seal support ring 1, like the embodiment shown here, that a handle 31 is arranged on the seal support ring 1, the handle protruding from the basic body 4 outwards, in the direction 17 away from the throughflow opening 3. The seal support ring 1 can be grasped at said handle 31 in order to carry out the installation and removal operations still to be explained below.

As already explained at the beginning, it is advantageously provided that at least a portion of the fastening means 5 of the seal support ring 1 is formed on or in the basic body 4. This is the case in all of the exemplary embodiments shown here. Specifically, it is provided here in this first exemplary embodiment that the seal support ring 1 has, as fastening means 5, a sequence of in each case keyhole-shaped openings 19 formed spaced apart from one another in the basic body 4. These keyhole-shaped openings 19 are advantageously distributed equidistantly, i.e. at in each case the same distance from one another, over the basic body 4, as is also the case here in the exemplary embodiment shown. Advantageously, as in this exemplary embodiment, the keyhole-shaped openings 19 then each have a head portion 20 and an elongate channel portion 21, wherein the channel portion 21 is tapered in relation to the head portion 20. The channel portions 21 are advantageously designed with a curvature corresponding to the shape of the annular basic body 4. One such keyhole-shaped opening 19 is illustrated individually in FIGS. 8 and 9. The ramp-shaped oblique surfaces 22 of the basic body 4 that bound the channel portion 21 can also be readily seen here. They ensure, during the operation yet to be explained below of installing the seal support ring 1 in the valve housing 6 or in the first housing part 28 thereof, that the seal support ring 1 is pressed with its seal ring 8 on the first side 7 of the basic body 4 against the valve housing 6 and is thus fastened there by clamping.

The operation for installing the seal support ring 1 of the first exemplary embodiment in the valve 2 will now be explained below with reference to FIGS. 10 to 16. The removal operation can be carried out in a correspondingly reverse sequence, and therefore this does not have to be discussed once again explicitly.

During the installation, first of all the first housing part 28, in which the valve opening 26 of the valve housing 6 is located, is separated from the second and from the third housing part 29 and 30. For this purpose, corresponding releasable connections, such as, for example, screw connections, clamping connections and the like, between the housing parts 28 and 29 can be realized without this having to be explained explicitly here. When the first housing part 28 is separated from the two housing parts 29 and 30, the valve disc 27 is at any rate also removed automatically from the first housing part 28. As illustrated in FIGS. 10 and 11, the seal support ring 1 can then be pushed from the side into the first housing part 28 through the corresponding opening 54 in the first housing part 28, said opening being released by removal of the housing parts 29 and 30. FIGS. 10 and 11 show the beginning of this insertion operation, wherein FIG. 11 illustrates the section along the intersecting line C-C from FIG. 10. It can also readily be seen in FIG. 11 that fastening bolts 44 which correspond in their position to the keyhole-shaped openings 19 are arranged in the valve housing 6 around the valve opening 26. In this exemplary embodiment, said fastening bolts are fixed in the valve housing 6 or in the housing part 28 thereof. They each have a mushroom-shaped head 45. The seal support ring 1 is then inserted into the valve housing 6 or here specifically into the housing part 28 thereof to such an extent that the head portions 20 of the keyhole-shaped openings 19 in the seal support ring 1 lie opposite the mushroom-shaped heads 45 of the fastening bolts 44. This is illustrated in FIG. 13, wherein FIG. 13 shows a section along the intersecting line D-D from FIG. 12. The seal support ring 1 is subsequently raised from the position according to FIG. 13 to such an extent that, as illustrated in FIG. 14, with the first side 7 of the basic body 4 in front, it comes with the seal ring 8 to bear against the region of the valve housing 6 which surrounds the valve opening 26. FIG. 14 also shows a section along the intersecting line D-D from FIG. 12.

Figure 15:
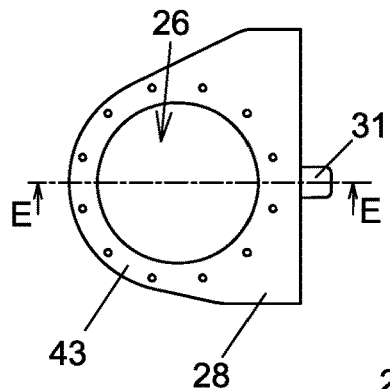

Subsequently, the seal support ring 1 is rotated by its handle 31 about an imaginary axis 55 such that the handle is pushed out of the position shown in FIG. 12 into the position shown in FIG. 15. The imaginary axis 55 is perpendicular to a plane defined by the valve opening 26 and the throughflow opening 3. During this rotational operation, starting from FIG. 14 to FIG. 16, which shows the section along the intersecting line E-E from FIG. 15, the mushroom-shaped heads 45 penetrate the channel portions 21 and come to bear against the oblique surfaces 22. By the seal support ring 1 being rotated appropriately far about the axis 55 and the interaction of the mushroom-shaped heads 45 and the ramp-like oblique surfaces 22, the seal support ring 1 is thereby clamped against the valve housing 6, and therefore the installation operation is finished and the first housing part 28 can again be arranged on the second housing part 29 and on the third housing part 30 such that the operating position shown in FIGS. 1 to 4 is again reached.

It can readily be seen in FIGS. 14 and 16, and also in FIG. 17 which is also described below, that, in this exemplary embodiment, the valve housing 6 or the first housing part 28 is provided with an undercut 46 which surrounds the valve opening 26 and behind which the seal ring 8 comes to lie when the seal support ring 1 is installed on the valve housing 6. This undercut 46 is aerodynamic and is therefore preferably provided, but is not absolutely necessary.

In this first exemplary embodiment, it is at any rate the case that the seal ring 8 of the seal support ring 1 has the dual function already explained at the beginning. Firstly, in the closed position of the valve disc 27, it seals off the valve disc 27 from the seal support ring 1. Secondly, in this exemplary embodiment, the seal support ring 8 however at the same time also ensures that the seal support ring 1 is correspondingly sealed from the valve housing 6 or the first housing part 28 thereof.

Figure 17:
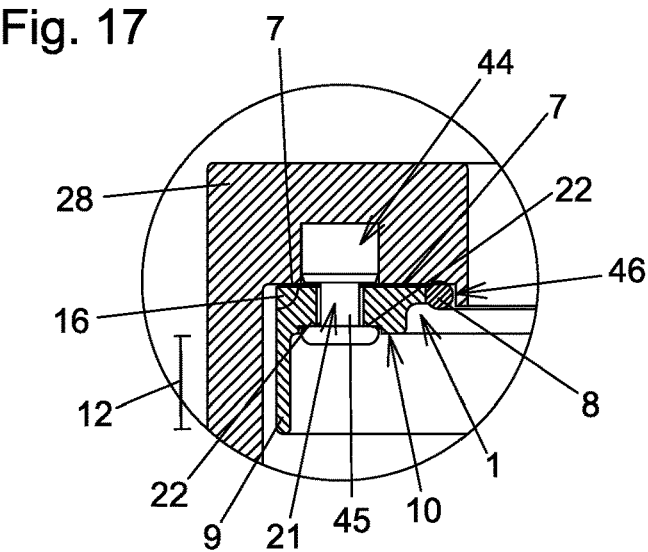

FIG. 17 now also shows an enlarged illustration in the region of one of the fastening bolts 44. It can be seen particularly readily here that, in preferred exemplary embodiments, the casing wall 9, as seen in a cross section, is arranged at a right angle 16 relative to a surface of the basic body 4 on the first side 7 of the basic body 4. In addition, it can also readily be seen in FIG. 17 how the fastening bolts 44 rest with their mushroom-shaped heads 45 on the oblique surfaces 22, delimiting the channel portion 21, on the basic body 4 such that the seal support ring 1 is pressed on the first side 7 of the basic body 4 with its seal ring 8 against the region of the valve housing 6 which surrounds the valve opening 26 or against the first housing part 28 thereof.

Figure 16:
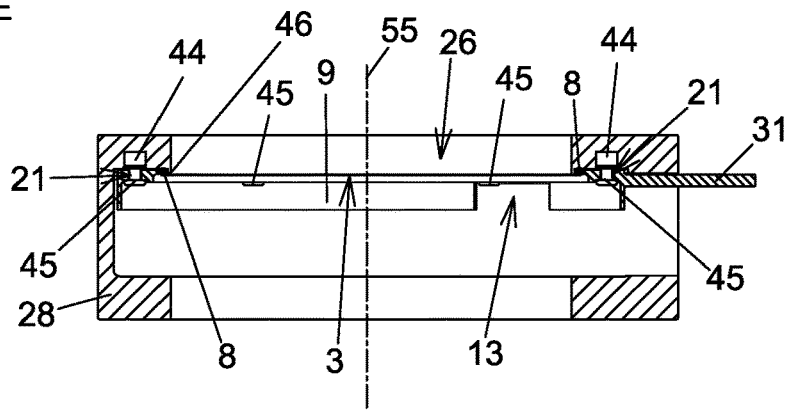
Figure 18:
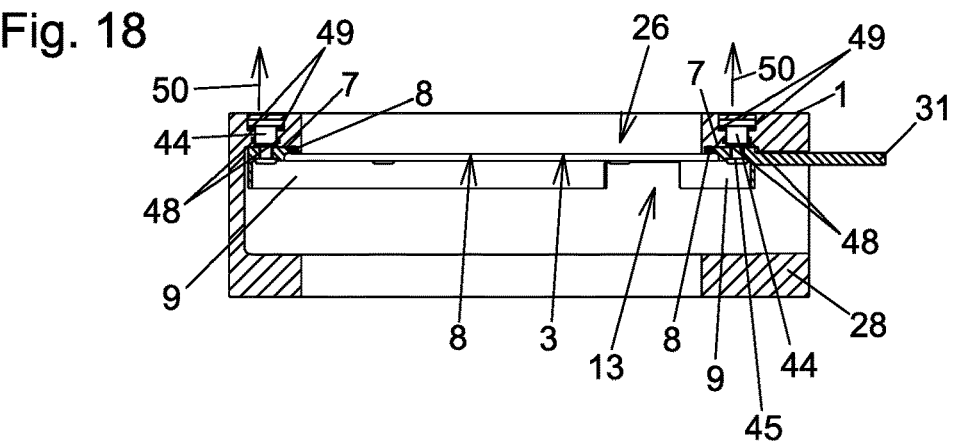
FIG. 18 shows an illustration of a variant, which is modified in a detail, of the first exemplary embodiment.

While, in this first exemplary embodiment, the fastening bolts 44 are fixed in the valve housing 6, FIG. 18 shows, in an illustration analogous to FIG. 16, an embodiment of the first exemplary embodiment, in which the fastening bolts 44 are not arranged fixedly, but rather by means of a prestress in the prestressing direction 50 in the valve housing 6. This prestressing in the prestressing direction 50, i.e. in the direction away from the seal support ring 1, additionally supports the clamping of the seal support ring 1 on the valve housing 6. This is specifically realized in this exemplary embodiment according to FIG. 18 by the fact that between the fastening bolt 44 and the valve housing 6 a spring body 49 or, in other words, an elastic body is in each case provided, which ensures the prestressing in the prestressing direction 50. The spring body 49 can be, for example, a disc spring, but also any other suitable elastic body which is known per se. In addition, as also realized in FIG. 18, it is then advantageously provided that the fastening bolt 44 is sealed off from the valve housing 6 in each case by means of an O ring 48 or another suitable seal. Apart from the differences described, this variant according to FIG. 18 corresponds in its construction and in its function, and therefore also with respect to the installation and removal of the seal support ring 1, to the first exemplary embodiment, and therefore reference can be made to the above statements regarding the first exemplary embodiment.

FIGS. 19 to 33 illustrate a second exemplary embodiment of the invention with a seal support ring 1 and a corresponding valve 2. FIGS. 19 to 22 show analogous illustrations to FIGS. 1 to 4 of the first exemplary embodiment. Apart from the differences that are also described below, there are for a start many consistencies between the second exemplary embodiment and the first exemplary embodiment. In particular, as regards the description of FIGS. 19 to 22, reference can be made to the description of FIGS. 1 to 4, with FIG. 21 showing the section along the intersecting line F-F from FIG. 20 and FIG. 22 the section along the intersecting line G-G from FIG. 20. The differences in the exemplary embodiments will be discussed below.

FIG. 23 shows the seal support ring 1 of the second exemplary embodiment in a view of the first side 7 on which the seal support ring 1, in its completely mounted state, in this second exemplary embodiment with its additional seal ring 51, lies against the valve housing 6 or first housing part 28 of the valve 2. FIG. 24 shows a perspective view in which the second side 10 of the basic body 4 opposite the first side 7 can be seen. FIG. 25 shows a perspective view obliquely from above of the first side 7, and FIG. 26 shows the detail in the region of the groove 23 in the form of a blind hole. Also in the case of the seal support ring 1, there are many parallels to the first exemplary embodiment, and therefore also here only the differences in relation to the first exemplary embodiment are discussed and otherwise reference is made to the corresponding description sections for the first exemplary embodiment.

A first difference in relation to the first exemplary embodiment consists in the type of configuration of the fastening means 5 of the seal support ring 1 and also of the corresponding counterparts on the valve housing 6 or the first housing part 28. Corresponding differences in the manner of the installation and removal also follow therefrom, as will also then however be explained further below in detail with reference to FIGS. 27 to 33.

Looking in particular at FIGS. 23, 25 and 26, it is seen that, in this exemplary embodiment, one of the fastening means 5 on the basic body 4 is an undercut groove 23 in the form of a blind hole which is open to an outer edge 14 of the basic body 4 facing away from the throughflow opening 3. This can be seen particularly readily and in an enlarged form in FIG. 26. In this exemplary embodiment, second or further fastening means are screws 25 arranged on the seal support ring 1 on the fixing side 24 opposite the groove 23. The screw shanks of said screws 25 can be seen in FIGS. 23 and 25. The screw heads of these screws can be seen in FIG. 24. Specifically, it is provided here, but also in other exemplary embodiments, that the screws 25 are arranged in the handle 31. However, this does not necessarily have to be the case. The screws 25 could also be arranged in another region of the seal support ring 1 on the fixing side 24 opposite the groove 23 in the form of a blind hole. Furthermore, it is pointed out that there may also be only one screw 25 or more than two screws 25. At any rate, as can be seen particularly readily in FIG. 26, the groove 23 in the form of a blind hole has an undercut 57 behind which the mushroom-shaped head 45 (also shown further below) of the fastening bolt 44 can engage during the installation.

Another difference in relation to the first exemplary embodiment consists in the number and arrangement of the seal rings. Unlike in the first exemplary embodiment, here there is not a single seal ring 8 which seals off both the valve disc 27 in its closed position from the seal support ring 1 and also the seal support ring 1 from the valve housing 6. In this exemplary embodiment, two different seal rings are provided for these two functions. There is firstly the seal ring 8 which is arranged on the second side 10, i.e. opposite the first side 7, and which can be seen, for example, in FIGS. 24, 28, 30, 32 and 33. This seal ring 8 serves for sealing the valve disc 27 in its closed position from the seal support ring 1 and could also be referred to as first seal ring 8. In addition, in this exemplary embodiment, there is then also the additional seal ring 51. The latter serves for sealing the seal support ring 1 from the valve housing 6 or the first housing part 28 thereof. In this exemplary embodiment, the additional seal ring 51 is arranged in a collar 52 of the seal support ring 1. This collar 52 protrudes from the basic body 4 of this exemplary embodiment on the first side 7, i.e. from the basic body 4 on the side opposite the casing wall 9.

Both the seal ring 8 and the additional seal ring 51 can be commercially available O rings which are known per se and are made from elastomer, in particular from perfluoroelastomer. Both seal rings, i.e. the seal ring 8 and the additional seal ring 51, are seal rings which are arranged exchangeably in one groove each. In the case of the seal ring 8, this groove 18 is arranged in the basic body 4 of the seal support ring 1, specifically, in this exemplary embodiment as also in other preferred exemplary embodiments, on the second side 10 opposite the first side 7. The additional seal ring 51 is arranged in a corresponding groove in the collar 52. For exchange purposes, said seal rings 8 and 51 can be removed from the corresponding grooves and replaced by correspondingly new seal rings. However, it is the case both for the seal ring 8 and for the additional seal ring 51 that, according to the invention, the inside diameter 11 of the casing wall 9 is larger than the inside diameter of the respective seal ring. The corresponding inside diameter 47 of the seal ring 8 is shown in FIG. 24. The corresponding inside diameter 56 of the additional seal ring 51 is shown in FIG. 25.

It will also be subsequently explained with reference to FIGS. 27 to 33 how the seal support ring 1 of the second exemplary embodiment is mounted in the valve housing 6. The removal then in turn takes place in the reverse sequence without this having to be explicitly explained once again.

FIG. 27 illustrates the first housing part 28 separately in turn from the second housing part 29 and from the third housing part 30. The valve disc 27 has therefore also already been removed from the interior of the first housing part 28. For the installation, the seal support ring 1, as illustrated in FIGS. 27 and 28, can now be pushed from the outside through the opening 54 into the first housing part 28. FIG. 28 shows the section along the intersecting line H-H from FIG. 27. It is then illustrated in FIGS. 29 and 30 how the seal support ring 1 with its groove 23 in the form of a blind hole is introduced into the mushroom-shaped head 45 of the fastening bolt 44 such that the mushroom-shaped head 45 engages behind the undercut 57 of the groove 23 in the form of a blind hole, as is illustrated in FIG. 32. It should be pointed out here that FIG. 30 illustrates the section I-I along the intersecting line in FIG. 29 and FIG. 30 illustrates the section along the intersecting line J-J from FIG. 31. Starting from the situation according to FIG. 32, the seal support ring 1 is then pivoted upwards with its first side 7 of the basic body 4 in front until its additional seal ring 51 lies over its entire circumference against the corresponding surface of the valve housing 6 or of the first housing part 28 surrounding the valve opening 26. The collar 52 with its additional seal ring 51 also penetrates the corresponding recess in the valve housing 6 or the first housing part 28 thereof such that the additional seal ring 51 bears in a sealing manner against the valve housing 6 or first housing part 28. During this pivoting movement, the groove 23 in the form of a blind hole is in engagement with the mushroom-shaped head 45 of the fastening bolt 44. After the corresponding pivoting upward operation, the screws 25 can then be screwed into the nut 53 illustrated in FIG. 33 and into the other nuts 53, not visible in this section, and therefore the seal support ring 1 is then completely mounted in the valve housing 6 or in the first housing part 28, as can be seen in FIG. 33. FIG. 33 shows the section along the angled intersecting line K-K from FIG. 31.

In the completely mounted state, then, in this exemplary embodiment, the collar 52 lies directly against the valve housing 6 on the first side 7 in a direction parallel to the prestressing direction 50. In this exemplary embodiment, this is preferably also applicable even if, as explained below, there is no prestressing at all of the fastening bolt 44 and/or of the nut 53 in the prestressing direction 50.

In this exemplary embodiment, the fastening bolt 44 is designed as also illustrated and also described in the variant according to FIG. 18. It is therefore sealed off from the valve housing 6 by means of an O ring 48 and elastically prestressed in the prestressing direction 50 by means of a spring body 49. However, it would in principle also be possible to arrange this one fastening bolt 44 rigidly in the valve housing 6 or in the first housing part 28 as in the first exemplary embodiment. In this exemplary embodiment, as can be seen in FIG. 33, it is also provided that the nuts 53 into which the screws 25 are screwed are prestressed elastically in the prestressing direction 50 by means of the spring body 49 and are sealed off from the valve housing 6 by means of the O ring 48. However, a variant is, of course, alternatively also conceivable here in which the nuts 53 are arranged or else formed fixedly in the valve housing 6.

KEY TO THE REFERENCE SIGNS

1 Seal support ring
2 Valve
3 Throughflow opening
4 Basic body
5 Fastening means
6 Valve housing
7 First side
8 Seal ring
9 Casing wall
10 Second side
11 Inside diameter
12 Protrusion
13 Wall opening
14 Edge
15 Centre point angle
16 Right angle
17 Direction
18 Groove
19 Keyhole-shaped opening
20 Head portion
21 Channel portion
22 Oblique surface
23 Groove in the form of a blind hole
24 Fixing side
25 Screw
26 Valve opening
27 Valve disc
28 First housing part
29 Second housing part
30 Third housing part
31 Handle
32 Supporting arm
33 Axle bolt
34 Valve drive
35 Lifting drive
36 Motor
37 Spindle
38 Nut
39 Carriage
40 Guide bolt
41 Pivoting drive
42 Motor
43 Flange
44 Fastening bolt
45 Mushroom-shaped head
46 Undercut
47 Inside diameter
48 O ring 49 Spring body
50 Prestressing direction
51 Additional seal ring
52 Collar
53 Nut
54 Opening
55 Axis
56 Inside diameter
57 Undercut

The invention claimed is:

1. A seal support ring for a valve, the seal support ring comprising:
   a throughflow opening and a basic body, which annularly surrounds the throughflow opening;
   a fastening arrangement is configured to fasten the seal support ring within a valve housing of the valve, such that the seal support ring is connectable to and removable from an interior of the valve housing;
   the basic body has a first side on which the seal support ring, in a state completely mounted on the valve housing, is adapted to lie against the valve housing;
   at least one seal ring made from an elastomer arranged on the basic body that surrounds the throughflow opening;
   a casing wall arranged on the basic body that surrounds the throughflow opening at least in regions and protrudes on a second side of the basic body, opposite the first side, the casing wall having a radially inwardly facing larger inside diameter than an inside diameter of the seal ring, and the casing wall being radially offset and non-contacting with the seal ring.

2. The seal support ring according to claim 1, wherein the casing wall has, on the second side opposite the first side, a protrusion of 15 mm to 40 mm relative to the basic body.

3. The seal support ring according to claim 1, wherein a wall opening formed as a blind hole is arranged in the casing wall.

4. The seal support ring according to claim 1, wherein the casing wall is arranged on an outer edge of the basic body facing away from the throughflow opening.

5. The seal support ring according to claim 4, wherein the casing wall is formed integrally with the basic body.

6. The seal support ring according to claim 1, wherein the casing wall, in cross-section, is arranged at a right angle relative to a surface of the basic body on the first side of the basic body.

7. The seal support ring according to claim 1, wherein at least a portion of the fastening arrangement is formed on or in the basic body.

8. The seal support ring according to claim 1, wherein the seal ring is fixed to the basic body or is arranged exchangeably in a groove of the basic body.

9. The seal support ring according to claim 8, wherein the seal ring is vulcanized on the basic body.

10. The seal support ring according to claim 1, wherein the fastening arrangement comprises a sequence of keyhole-shaped openings formed spaced apart from one another in the basic body.

11. The seal support ring according to claim 1, wherein the fastening arrangement comprises an undercut groove on the basic body formed as a blind hole which is open towards an outer edge of the basic body facing away from the throughflow opening, and at least one screw is arranged on the seal support ring on a fixing side of the first side and at an opposite end as the undercut groove.

12. A valve, comprising:
   a valve housing;
   a valve opening in the valve housing;
   a valve disc configured to close the valve opening in a closed position of the valve disc;
   a seal support ring according to claim 1 fastened removably to the valve housing;
   wherein the valve opening of the valve and the throughflow opening of the seal support ring are arranged aligned with each other, and the valve disc, in the closed position, lies against the seal ring of the seal support ring and is surrounded by the casing wall of the seal support ring.

* * * * *